(No Model.)

L. T. AUSTIN.
THRASHING MACHINE ATTACHMENT.

No. 528,915. Patented Nov. 13, 1894.

ATTEST
Nora Graham.
Ina Graham.

INVENTOR
L. T. Austin
by his attorney
L. P. Graham

United States Patent Office.

LOREY T. AUSTIN, OF ROSSVILLE, ILLINOIS, ASSIGNOR OF ONE-HALF TO BYRON E. CRONKHITE, OF SAME PLACE.

THRASHING-MACHINE ATTACHMENT.

SPECIFICATION forming part of Letters Patent No. 528,915, dated November 13, 1894.

Application filed June 30, 1894. Serial No. 516,166. (No model.)

*To all whom it may concern:*

Be it known that I, LOREY T. AUSTIN, of Rossville, in the county of Vermilion and State of Illinois, have invented certain new and useful Improvements in Thrashing-Machine Attachments, of which the following is a specification.

This invention relates to the concaves of thrashing machines. It is exemplified in the structure hereinafter specified, and it is defined in the appended claims.

In thrashing machines as ordinarily constructed the grain of the first bundle fed to the machine is thrashed and at once completely separated from the straw, but the grain of the second, and each succeeding bundle is mixed with the straw of the bundle next preceding, with the result that a great deal of mechanism and labor is required to effect the separation. In addition to this the grate ordinarily used is liable to become clogged by matted refuse from damp straw, and there is no convenient provision for cleaning the same.

It is the object of this invention to enable the grain to be separated, in great part at least, by the action of the cylinder teeth; to prevent subsequent commingling of the straw and grain; and to provide a grate, or the equivalent thereof, that will be kept clean by the action of the cylinder teeth.

Figure 1:
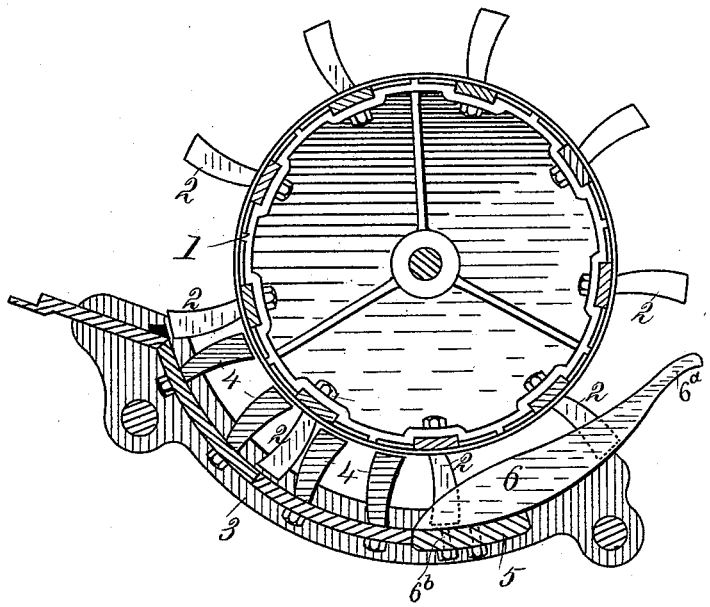
Figure 2:
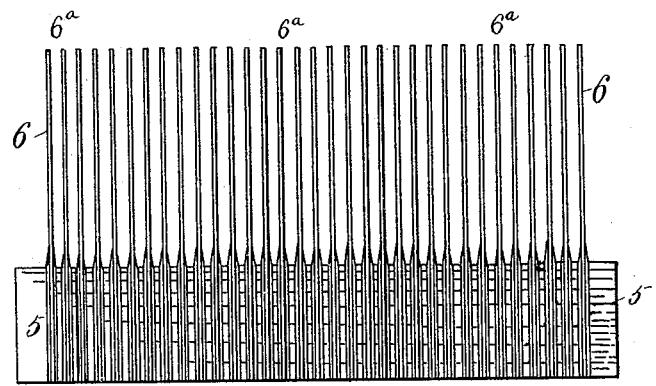
Figure 3:
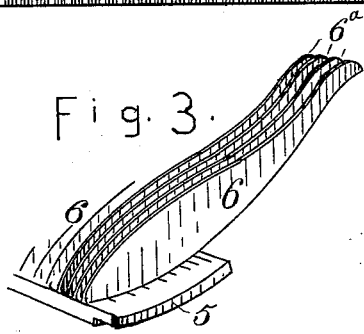

In the drawings forming part of this specification, Figure 1 is a vertical section crosswise of the cylinder and concave. Fig. 2 is a plan of the part of the concave that illustrates the features of this invention, and Fig. 3 is a perspective representation of a fragment of the part of the concave illustrated in Fig. 2.

The cylinder is shown at 1 and the teeth thereof at 2. The frame of the concave is shown at 3, and at 4 are seen teeth of sections of the concave. At 5 is shown a section of the concave that is provided with rearwardly extending fingers 6. The fingers are secured to section 5 by bolt extensions $6^b$, shown in dotted lines in Fig. 1, and they each occupy a space between a ring, or circumferential set, of the teeth of the cylinder. The general direction of the surfaces of the fingers opposed to the cylinder is tangential with relation to the cylinder, that is to say, the surfaces first approach and then recede from the cylinder, but throughout a portion of their length they describe arcs concentric, or nearly so, with the circumference of the cylinder. The particular contour given is not essential to the invention, and the lines described may be straight and tangential throughout, or they may be concentric throughout, and in the first instance the straw will be released more quickly than in the second instance. The ends of the fingers incline away from the cylinder, as shown at $6^a$, which is a desirable but not indispensable peculiarity.

The cylinder, the concave frame and the toothed sections of the concave are the same as those ordinarily used, and the section 5 is adapted to be slid into the groove of the frame in the customary manner.

The thrashing of the grain is effected by the cylinder and the toothed sections of the concave. The straw is held up to the action of the cylinder teeth by the inclined surfaces of the fingers, and the teeth beat the grain out of and away from the straw before the straw is permitted to escape from the fingers. The fingers act as a grate, to permit separation. The teeth of the cylinder act between each pair of fingers, and consequently it is impossible for the spaces between fingers to become obstructed.

The grain-separating function of the fingers, considered apart from the finger-cleaning action of the cylinder teeth does not require that the teeth shall pass between fingers. In this respect the essential requirements are that the fingers shall begin under the center of the cylinder and shall follow the circumference of the cylinder, in a general manner, sufficiently close to the teeth to compel the straw to submit to the beating action thereof.

Having thus described my invention, I claim as new and desire to secure by Letters Patent—

1. The combination with the cylinder and the toothed sections of the concave of a thrashing machine, of a set of fingers beginning under the center of the cylinder and extending upward and backward adjacent to the teeth of the cylinder, substantially as set forth.

2. The combination with the cylinder and the toothed sections of the concave of a thrashing machine, of a set of fingers extending rearwardly from the toothed sections and each occupying a space between circumferential sets of teeth of the cylinder, substantially as set forth.

3. The combination with the cylinder and the toothed sections of the concave of a thrashing machine, of a set of fingers extending rearwardly from the toothed sections in a generally tangential direction with relation to the cylinder, and each occupying a space between circumferential sets of cylinder teeth, substantially as set forth.

In testimony whereof I sign my name in the presence of two subscribing witnesses.

LOREY T. AUSTIN.

Attest:
I. D WALKER,
L. P. GRAHAM.